(12) United States Patent
Raghavan et al.

(10) Patent No.: US 11,736,957 B2
(45) Date of Patent: Aug. 22, 2023

(54) TECHNIQUES FOR DYNAMIC DOWNLINK AND UPLINK QUASI CO-LOCATION RELATIONSHIP REPORTING

(71) Applicant: QUALCOMM Incorporated, San Diego, CA (US)

(72) Inventors: Vasanthan Raghavan, West Windsor Township, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 113 days.

(21) Appl. No.: 17/339,292

(22) Filed: Jun. 4, 2021

(65) Prior Publication Data

US 2021/0392515 A1 Dec. 16, 2021

Related U.S. Application Data

(60) Provisional application No. 63/037,249, filed on Jun. 10, 2020.

(51) Int. Cl.
| | |
|---|---|
| *H04W 52/02* | (2009.01) |
| *H04W 72/0446* | (2023.01) |
| *H04W 16/28* | (2009.01) |
| *H04L 5/00* | (2006.01) |

(52) U.S. Cl.
CPC ............ *H04W 16/28* (2013.01); *H04L 5/0048* (2013.01); *H04W 52/0229* (2013.01); *H04W 72/0446* (2013.01)

(58) Field of Classification Search
CPC ............ H04W 16/28; H04W 52/0229; H04W 72/0446; H04L 5/0048
USPC .......................................................... 370/329
See application file for complete search history.

(56) References Cited

U.S. PATENT DOCUMENTS

| | | | |
|---|---|---|---|
| 2019/0158319 A1* | 5/2019 | Cezanne | H04L 1/0003 |
| 2020/0119875 A1 | 4/2020 | John Wilson et al. | |
| 2020/0177265 A1* | 6/2020 | Guan | H04W 76/11 |
| 2020/0280483 A1* | 9/2020 | Zhang | H04B 7/06 |

FOREIGN PATENT DOCUMENTS

| | | | | |
|---|---|---|---|---|
| WO | 2019031935 A1 | 2/2019 | | |
| WO | WO-2019031935 A1 * | 2/2019 | ............ | H04B 7/024 |

OTHER PUBLICATIONS

International Search Report and Written Opinion—PCT/US2021/036177—ISA/EPO—dated Sep. 23, 2021.

* cited by examiner

*Primary Examiner* — Intekhaab A Siddiquee
(74) *Attorney, Agent, or Firm* — Arent Fox, LLP

(57) ABSTRACT

Techniques for dynamic downlink and uplink quasi co-location (QCL) relationship reporting are disclosed. In an example, a base station may determine to change a QCL reporting state for a user equipment (UE), wherein the QCL reporting state is one of an active QCL reporting state or a restricted QCL reporting state. The base station may also generate an indication to indicate the change in the QCL reporting state to the UE in response to the determining the change in the QCL reporting state. The base station may also transmit, to the UE, the indication in response to the generating the indication.

28 Claims, 5 Drawing Sheets

TECHNIQUES FOR DYNAMIC DOWNLINK AND UPLINK QUASI CO-LOCATION RELATIONSHIP REPORTING

CROSS-REFERENCE TO RELATED APPLICATION

This application claims the benefit of U.S. Provisional Application Ser. No. 63/037,249, entitled "TECHNIQUES FOR DYNAMIC DOWNLINK AND UPLINK QUASI CO-LOCATION RELATIONSHIP REPORTING" and filed on Jun. 10, 2020, which is expressly incorporated by reference herein in its entirety.

TECHNICAL FIELD

Aspects of the present disclosure relate generally to communication systems, and more particularly, to techniques for dynamic downlink and uplink quasi co-location (QCL) relationship reporting.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is fifth generation (5G) new radio (NR) technologies. 5G NR technologies are a part of a continuous mobile broadband evolution promulgated by Third Generation Partnership Project (3GPP) to meet new requirements associated with latency, reliability, security, scalability (e.g., with Internet of Things (IoT)), and other requirements. 5G NR technologies include services associated with enhanced mobile broadband (eMBB), massive machine type communications (mMTC), and ultra reliable low latency communications (URLLC).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. The sole purpose of the summary is to present some concepts of one or more aspects in a simplified form as a prelude to the more detailed description that is presented later.

Shorter slot durations may result from the use of high frequency communications. The shorter slot durations may lead to additional overhead in communications as more frequent quasi co-location (QCL) relationship changes may occur. The present disclosure provides systems, apparatus, and methods for reducing overhead in these situations by allowing a base station to restrict QCL reporting by a user equipment (UE).

In an aspect, a method of wireless communication by a base station is provided. The method may include determining to change a quasi co-location (QCL) reporting state for a user equipment (UE), wherein the QCL reporting state is one of an active QCL reporting state or a restricted QCL reporting state. The method may also include generating an indication to indicate a change in the QCL reporting state to the UE in response to the determining to change the QCL reporting state. The method may also include transmitting, to the UE, the indication in response to the generating the indication.

In another aspect, a method of wireless communication by a user equipment (UE) is provided. The method may include receiving, from a base station, an indication to change a quasi co-location (QCL) reporting state of the UE. The method may also include setting the QCL reporting state to one of an active QCL reporting state or a restricted QCL reporting state based on the indication. The method may also include transmitting QCL reports to the base station in response to the setting the QCL reporting state to the active QCL reporting state. The method may also include restricting transmission of the QCL reports to the base station in response to the setting the QCL reporting state to the restricted QCL reporting state.

In another aspect, apparatuses and computer-readable mediums for performing the operations of the methods are also disclosed.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
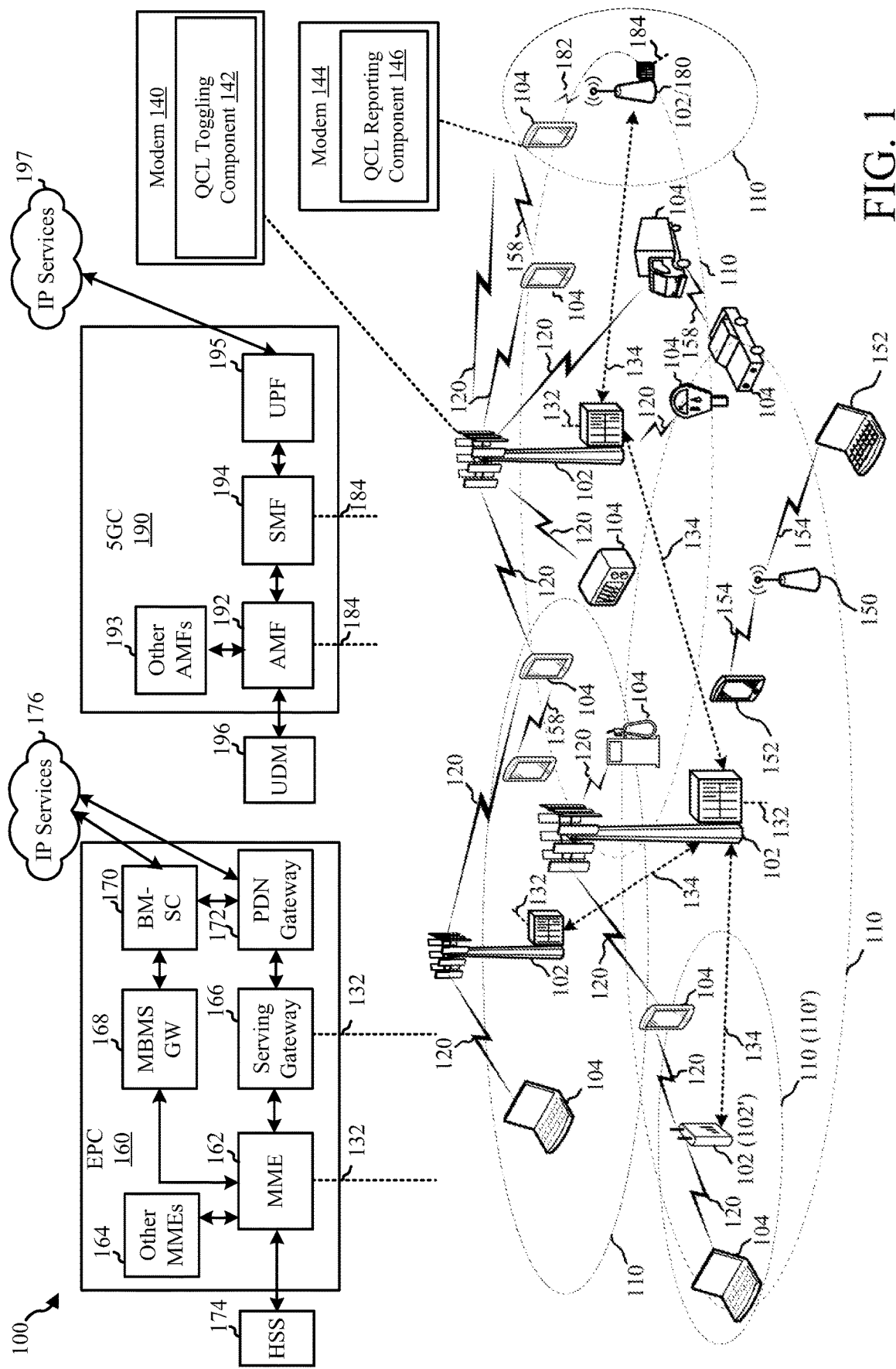
FIG. 1 is a schematic diagram of an example wireless communications system and access network, according to aspects of the present disclosure.

The detailed description, set forth below, in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As carrier frequencies increase (e.g., frequency range 4 (FR4) covers 52.6-114.25 GHz) for fifth generation (5G) new radio (NR) technologies, large antenna arrays can be used at a user equipment (UE) side. However, these large arrays need to be controlled by multiple radio frequency integrated circuits (RFICs) and typically consume a large amount of power which may lead to high thermal overheads. Thus, there is a desire to see antenna elements as a degree of freedom exercised dynamically over time.

In 5G-NR, a quasi co-location (QCL) relationship (or configuration) may exist between one or more signals. In a QCL relationship, properties of a first channel over which a symbol on one antenna port is communicated can be inferred from a second channel over which a symbol on another antenna port is communicated. This means, in a QCL relationship, a relationship between the antenna ports (and the corresponding signaling beams) of the respective transmissions exists. For example, in a QCL relationship, transmissions sharing the same antenna port experience the same channel. Sometimes, transmissions from different antenna ports experience radio channels that share some common characteristics (this is captured by QCL relationship). As another example, a physical downlink (DL) shared channel (PDSCH) and a DL reference signal (RS) may have a QCL relationship in the sense that beam properties of one channel may be derived from the other channel. However, this does not mean that the beam weights used for PDSCH need to be directly obtained from the DL RS measurements, but just based on or derived from DL RS measurements.

Four QCL type relationships commonly exist for DL transmissions in 3GPP 5G-NR: QCL-Type A, QCL-Type B, QCL-Type C, and QCL-Type D. For a QCL-Type A relationship, two or more ports (or channels) share the same settings related to Doppler shift, Doppler spread, average delay, and delay spread. For a QCL-Type B relationship, two or more ports (or channels) share the same settings related to Doppler shift and Doppler spread. For a QCL-Type C relationship, two or more ports (or channels) share the same settings related to Doppler shift and average delay. For a QCL-Type D relationship, two or more ports (or channels) share the same settings related to spatial receiver parameters.

Typically, the four QCL type relationships can be potentially used for DL transmissions. However, QCL-Type A, B, and C are typically meant for frequency range 1 (FR1) and QCL-Type A, QCL-Type C, and QCL-Type D are typically meant for frequency range 2 (FR2). Further, QCL relationships are typically restricted to QCL-Type D for uplink (UL) transmissions.

For frequency range 4 (FR4), a bandwidth (BW) as well as subcarrier spacings (e.g., 240-960 kHz subcarrier spacing (SCS) and 400-1600 MHz occupied BW) may be considerably higher than in FR2 (e.g., 120 kHz and 200 MHz/component carrier (CC) occupied BW at 28 GHz) which may lead to shorter slot durations. Since subarrays used at the UE side may change dynamically (e.g., symbol-to-symbol or across slots) in FR4, QCL-Type A, B, and C relationships, which are based on delay and Doppler settings, could change more frequently than a QCL-Type D relationship as the beam formed delay/Doppler spread can change with subarray changes. As indicated, a QCL-Type D relationship corresponds to "Spatial Rx parameters" which means that only spatial relationships corresponding to BW changes or beam weights (e.g., broad beam to narrow beam in physical X control channel (PXCCH) to physical X shared channel (PXSCH), where X designates UL or DL) may be considered.

Further, a more frequent QCL relationship change (e.g., QCL Types A, B, or C) may result in a higher overhead. QCL relationships are configured between one or two DL RS and demodulation RS (DM-RS) ports of PDSCH with higher layer parameters qclType-1 and qclType-2, if configured. QCL types of the two DL RSs are not the same regardless of whether the QCL mappings are to the same DL RS or a different DL RS. So, a UE may be offered two different RSs: one for QCL-Types A, B, or C and another for QCL-Type D. When a beam change (e.g., beam weight change by switching symbols to point from one direction to another direction) occurs at a base station (e.g., P2 beam sweep), since a delay or a Doppler spread could change (as seen from the UE side), a fixed RS offered for QCL-Type A may not be sufficient to associate with a DM-RS of PXSCH. In other words, since summaries (e.g., QCL reports) or antenna elements frequently change at some frequency ranges (e.g., FR4) due to shorter symbol durations and dynamically changing antenna elements, additional reporting (e.g., QCL reporting) may be required by the UE.

Thus, aspects of the present disclosure provide a more dynamic update of QCL relationships for both the DL and the UL. In an example, a base station eliminates or reduces the RSs associated with the QCL Type A, B, or C or restricts these RSs to certain situations. In an example, a DM-RS of PXCCH or PXSCH may be eliminated or reduced. In another example, the base station may signal to the UE which of either DM-RS of PXCCH or DM-RS of PXSCH (or both) are eliminated. In other words, the base station may dynamically reduce overhead from reporting QCL mappings due to symbol changes. For example, the base station may determine that QCL reporting will be burdensome to the UE or the UE may indicate to the base station that the QCL reporting will be burdensome. Accordingly, the base station may restrict usage of QCL reporting for a number of slots or for certain slots.

In an aspect, the base station may control the reporting from symbol to symbol, slot to slot, or multiple slots to multiple slots. Further, control of the reporting by base station may be configured by upper layer parameters associated with periodicity and extent of beam reporting.

In an aspect, the base station may indicate to the UE whether to perform QCL reporting or to restrict QCL reporting. The UE may monitor messages from the base station and once an indication is received from the base station, may perform QCL reporting until an indication to restrict QCL reporting is received or may restrict QCL reporting until an indication to perform QCL reporting is received. When the UE is not performing QCL reporting, the base station may continue to use QCL relationship settings, such as delay/Doppler settings, received from a previous QCL reporting from the UE.

In an aspect, a QCL-type toggle bit (or toggler bit) may be used for signaling the elimination or reduction of the RSs. In an example, the QCL-toggle bit may be transmitted through PDCCH such as a DL control information (DCI). In an example, when a beam changes and a QCL-Type D relationship does not change, the QCL-type toggle bit may be toggled (e.g., a current value of the bit is changed from a previous value) such that the UE will know that the QCL-Type A properties have changed. In this case, the UE may reset filtering for delay/Doppler related parameters due to the changes. In another example, when there is no beam change and the QCL-Type D relationship is not changed, the QCL-type toggle bit is not toggled (e.g., a current value of the bit is the same as a previous value). In this example, the UE may still be offered a DL RS with QCL-Type A, B, or C (e.g., Tracking RS (TRS)), but DL RS may provide broad (or coarse) information and DM-RS of PXCCH or PXSCH may provide more detailed (or refined) information on QCL-Type A, B, or C. Additionally, a separate RS (similar to phase tracking RS (PT-RS)) can be used which may be transmitted with data. Thus, according to the present disclosure, beam toggling may be used to signal more detailed (or fine) changes of the beams through the use of the QCL-type toggle bit.

Turning now to the figures, examples of techniques for dynamic DL and UL QCL relationship reporting are depicted. It is to be understood that aspects of the figures may not be drawn to scale and are instead drawn for illustrative purposes.

Referring to FIG. 1, a diagram illustrating an example of a wireless communications system and an access network 100 is provided. The wireless communications system (also referred to as a wireless wide area network (WWAN)) includes base stations 102, UEs 104, an Evolved Packet Core (EPC) 160, and a 5G Core (5GC) 190.

The base station 102 may include a modem 140 having a QCL toggling component 142 configured to determine whether to change a QCL reporting state of the UE 104 from a restricted reporting state to an active reporting state, or vice versa, and signal to the UE 104 the change in QCL reporting state.

The UE 104 may include a modem 144 having a QCL reporting component 146 configured to receive an indication from the base station 102 to restrict or perform QCL reporting in response to the indication.

In an aspect, the base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). Each of the backhaul links 132, 134, and 184 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
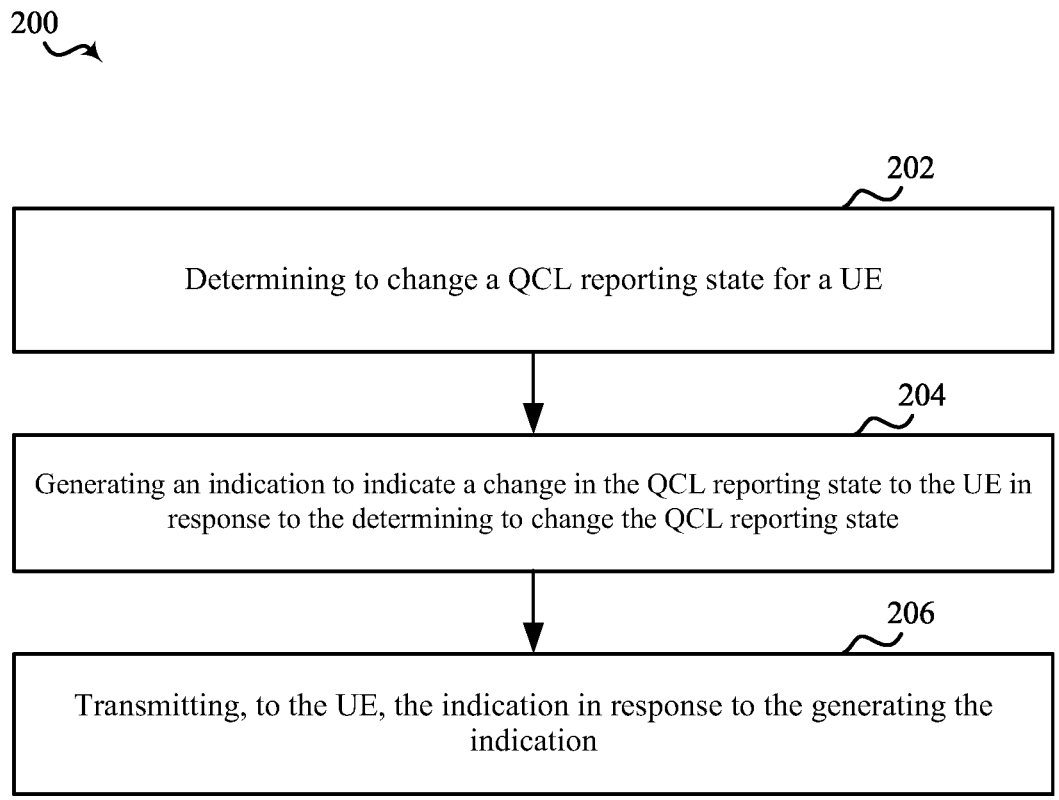
FIG. 2 is a flowchart of an example method of wireless communications by the base station of FIG. 1, according to aspects of the present disclosure.

Referring to FIG. 2, an example method of wireless communications is disclosed. The method 200 may be performed by the base station 102 along with any of the components (see e.g., FIG. 3) of the base station 102. For example, the method 200, may be performed by one or more of a processor 312, a transceiver 302, the modem 140, the QCL toggling component 142, and/or one or more additional components/subcomponents of the base station 102.

Turning to FIG. 2, at 202, the method 200 may include determining to change a QCL reporting state for a UE. For example, one or more of the processor 312, the modem 140, the QCL toggling component 142 and/or one or more components/subcomponents of the base station 102 may be configured to determine to change a QCL reporting state for the UE 104. Thus, the processor 312, the modem 140, the QCL toggling component 142, and/or one or more components/subcomponents of the base station 102 may define the means for determining to change a QCL reporting state for the UE 104. In an example, the QCL reporting state is one of an active QCL reporting state or a restricted QCL reporting state. In an example, the base station 102 may determine to change the QCL reporting state in response to receiving a request from the UE 104 to restrict QCL reporting. In another example, the base station 102 may determine to change the QCL reporting state in response to determining a beam change occurred. In another example, the base station 102 may determine to change the QCL reporting state in response to the beam change and further in response to a QCL type for a current beam being the same QCL type as the previous beam. In another example, the base station 102 may determine that QCL reporting will result in a power saving issue for the UE 104 and determine to determine to change a QCL reporting state for the UE 104 in response to the determination of the power saving issue. In an example, the base station 102 may determine to change the QCL reporting state on a symbol-to-symbol basis, a slot-to-slot basis, or a multiple slot-to-multiple slot basis.

At 204, the method 200 may also include generating an indication to indicate a change in the QCL reporting state to the UE in response to the determining to change the QCL reporting state. For example, one or more of the processor 312, the modem 140, the QCL toggling component 142 and/or one or more components/subcomponents of the base station 102 may be configured to generate an indication to indicate a change in the QCL reporting state to the UE 104 in response to determining to change the QCL reporting state. Thus, the processor 312, the modem 140, the QCL toggling component 142, and/or one or more components/ subcomponents of the base station 102 may define the means for generating an indication to indicate a change in the QCL reporting state to the UE 104 in response to the determining to change the QCL reporting state. In an example, generating the indication may include setting a current value (e.g., 1) of a QCL-type toggle bit to be different from a previous value (e.g., 0) of the QCL-type toggle bit, or vice versa (e.g., from 0 to 1). In an example, the indication further indicates changes to a first QCL type, a second QCL type, or both QCL types. In another example, the indication may be a message transmitted through a DCI to the UE 104.

At 206, the method 200 may include transmitting, to the UE, the indication in response to the generating the indication. For example, one or more of the processor 312, the transceiver 302, the modem 140, the QCL toggling component 142 and/or one or more components/subcomponents of the base station 102 may be configured to transmit, to the UE 104, the indication in response to the generating the indication. Thus, the processor 312, the transceiver 302, the modem 140, the QCL toggling component 142, and/or one or more components/subcomponents of the base station 102 may define the means for transmitting, to the UE 104, the indication in response to the generating the indication. In an example, the indication may be transmitted through a PDCCH such as a DCI.

In some examples, the method 200 may optionally include storing QCL relationship settings received from a previous QCL report and communicating with the UE based on the QCL relationship settings in response to the QCL reporting state being the restricted QCL reporting state. For example, one or more of the processor 312, the transceiver 32, the modem 140, the QCL toggling component 142 and/or one or more components/subcomponents of the base station 102 may be configured to store QCL relationship settings received from a previous QCL report and communicate with the UE based on the QCL relationship settings in response to the QCL reporting state being the restricted QCL reporting state. Thus, the processor 312, the transceiver 302, the modem 140, the QCL toggling component 142, and/or one or more components/subcomponents of the base station 102 may define the means for storing QCL relationship settings received from a previous QCL report and communicating with the UE based on the QCL relationship settings in response to the QCL reporting state being the restricted QCL reporting state.

Figure 3:
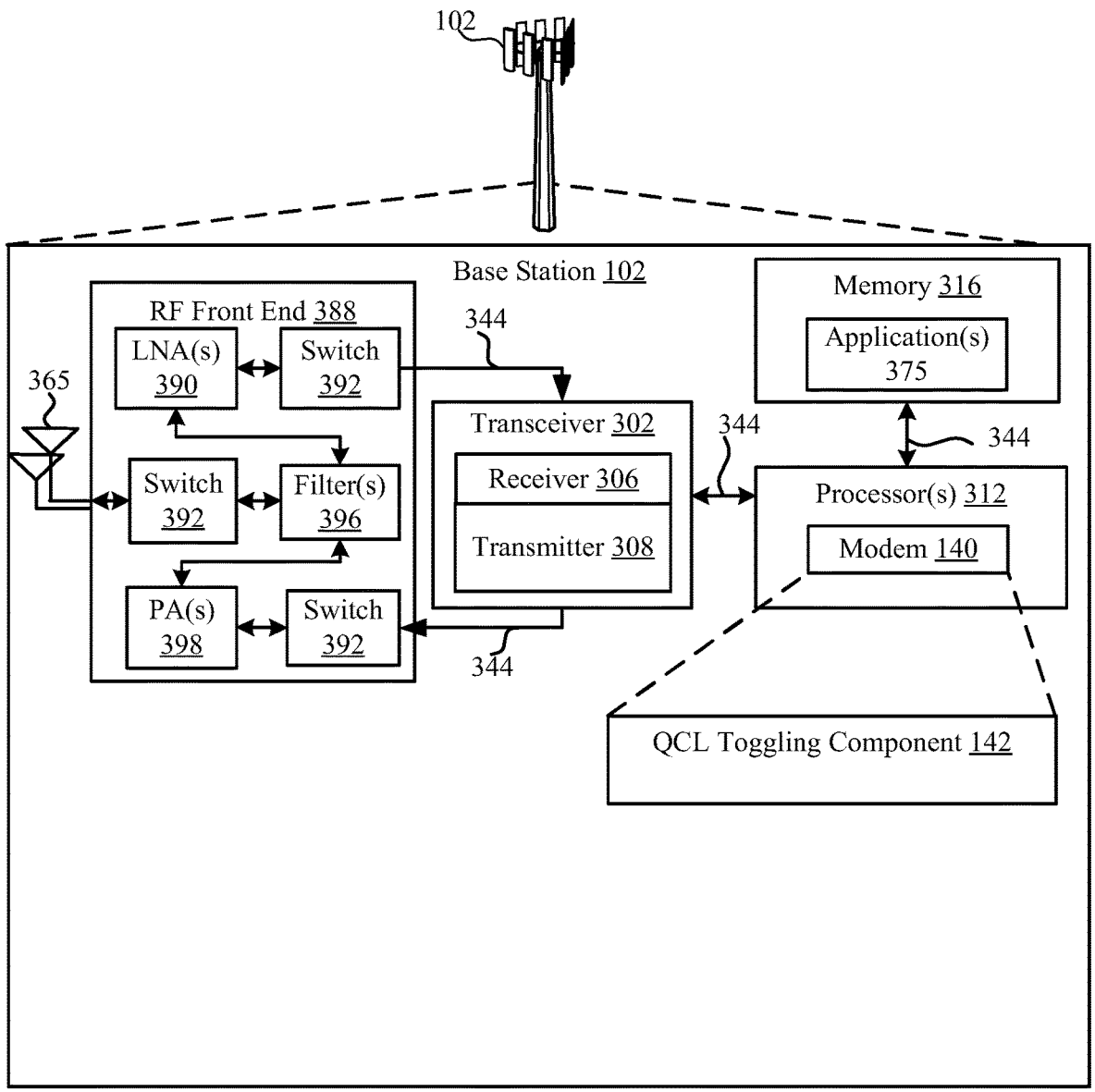
FIG. 3 is a schematic diagram of an example of the base station of FIG. 1, according to aspects of the present disclosure.

Referring to FIG. 3, one example of an implementation of the base station 102 may include a variety of components, some of which have already been described above, but including components such as one or more processors 312, memory 316, and transceiver 302 in communication via one or more buses 344, which may operate in conjunction with the modem 140 to enable one or more of the functions of the method 200 described herein. The one or more processors 312, modem 144, memory 316, the transceiver 302, RF front end 388 and one or more antennas 365, may be configured to support voice and/or data calls (simultaneously or non-simultaneously) in one or more radio access technologies.

In an aspect, the one or more processors 312 may include the modem 140 that uses one or more modem processors. The various functions related to the QCL toggling component 142 may be included in the modem 140 and/or the processors 312 and, in an aspect, may be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with the transceiver 302. In other aspects, some of the features of the one or more processors 312 and/or the modem 140 may be performed by the transceiver 302.

Also, the memory 316 may be configured to store data used herein and/or local versions of applications 375 or the QCL toggling component 142 and/or one or more of its subcomponents being executed by the at least one processors 312. The memory 316 may include any type of computer-readable medium usable by a computer or the at least one processor 312, such as random access memory (RAM), read only memory (ROM), tapes, magnetic discs, optical discs, volatile memory, non-volatile memory, and any combination thereof. In an aspect, for example, the memory 316 may be a non-transitory computer-readable storage medium that stores one or more computer-executable codes defining the QCL toggling component 142 and/or one or more of its subcomponents, and/or data associated therewith, when the base station 102 is operating the at least one processor 312 to execute the QCL toggling component 142 and/or one or more of its subcomponents.

The transceiver 302 may include at least one receiver 306 and at least one transmitter 308. The receiver 306 may include hardware, firmware, and/or software code executable by a processor for receiving data, the code comprising instructions and being stored in a memory (e.g., computer-readable medium). The receiver 306 may be, for example, a radio frequency (RF) receiver. In an aspect, the receiver 306 may receive signals transmitted by at least one of the UEs 104. Additionally, the receiver 306 may process such received signals, and also may obtain measurements of the signals, such as, but not limited to, Ec/Io, SNR, RSRP, RSSI, etc. The transmitter 308 may include hardware, firmware, and/or software code executable by a processor for transmitting data, the code comprising instructions and being stored in a memory (e.g., computer-readable medium). A suitable example of the transmitter 308 may include, but is not limited to, an RF transmitter. The transceiver 302, receiver 306, and/or transmitter 308 may be configured to operate in mmW frequencies and/or near mmW frequencies.

Moreover, in an aspect, the base station 102 may include the RF front end 388, which may operate in communication with one or more antennas 365 and the transceiver 302 for receiving and transmitting radio transmissions, for example, wireless communications received by the base station 102 or wireless transmissions transmitted by the base station 102. The RF front end 388 may be connected to the one or more antennas 365 and may include one or more low-noise amplifiers (LNAs) 390, one or more switches 392, one or more power amplifiers (PAs) 398, and one or more filters 396 for transmitting and receiving RF signals.

In an aspect, the LNA 390 may amplify a received signal at a desired output level. In an aspect, each of the LNAs 390 may have a specified minimum and maximum gain values. In an aspect, the RF front end 388 may use the one or more switches 392 to select a particular LNA 390 and its specified gain value based on a desired gain value for a particular application.

The one or more PA(s) 398 may be used by the RF front end 388 to amplify a signal for an RF output at a desired output power level. In an aspect, each of the PAs 398 may have specified minimum and maximum gain values. In an aspect, the RF front end 388 may use the one or more switches 392 to select a particular PA 398 and its specified gain value based on a desired gain value for a particular application.

Also, for example, the one or more filters 396 may be used by the RF front end 388 to filter a received signal to obtain an input RF signal. Similarly, in an aspect, for example, a respective filter 396 may be used to filter an output from a respective PA 398 to produce an output signal for transmission. In an aspect, each of the filters 396 may be connected to a specific LNA 390 and/or PA 398. In an aspect, the RF front end 388 may use the one or more switches 392 to select a transmit or receive path using a specified filter 396, LNA 390, and/or PA 398, based on a configuration as specified by the transceiver 302 and/or the processor 312.

As such, the transceiver 302 may be configured to transmit and receive wireless signals through the one or more antennas 365 via the RF front end 388. In an aspect, the transceiver 302 may be tuned to operate at specified frequencies such that the base station 102 may communicate with, for example, one or more of the UEs 104. In an aspect, for example, the modem 140 may configure the transceiver 302 to operate at a specified frequency and power level based on the base station 102 configuration of the base station 102 and the communication protocol used by the modem 140.

In an aspect, the modem 140 may be a multiband-multimode modem, which may process digital data and communicate with the transceiver 302 such that the digital data is sent and received using the transceiver 302. In an aspect, the modem 144 may be multiband and be configured to support multiple frequency bands for a specific communications protocol. In an aspect, the modem 140 may be multimode and be configured to support multiple operating networks and communications protocols. In an aspect, the modem 140 may control one or more components of the base station 102 (e.g., RF front end 388, transceiver 302) to enable transmission and/or reception of signals from the network based on a specified modem configuration. In an aspect, the modem configuration may be based on the mode of the modem 140 and the frequency band in use. In another aspect, the modem configuration may be based on base station configuration information associated with the base station 102 as provided by the network during cell selection and/or cell reselection.

Figure 4:
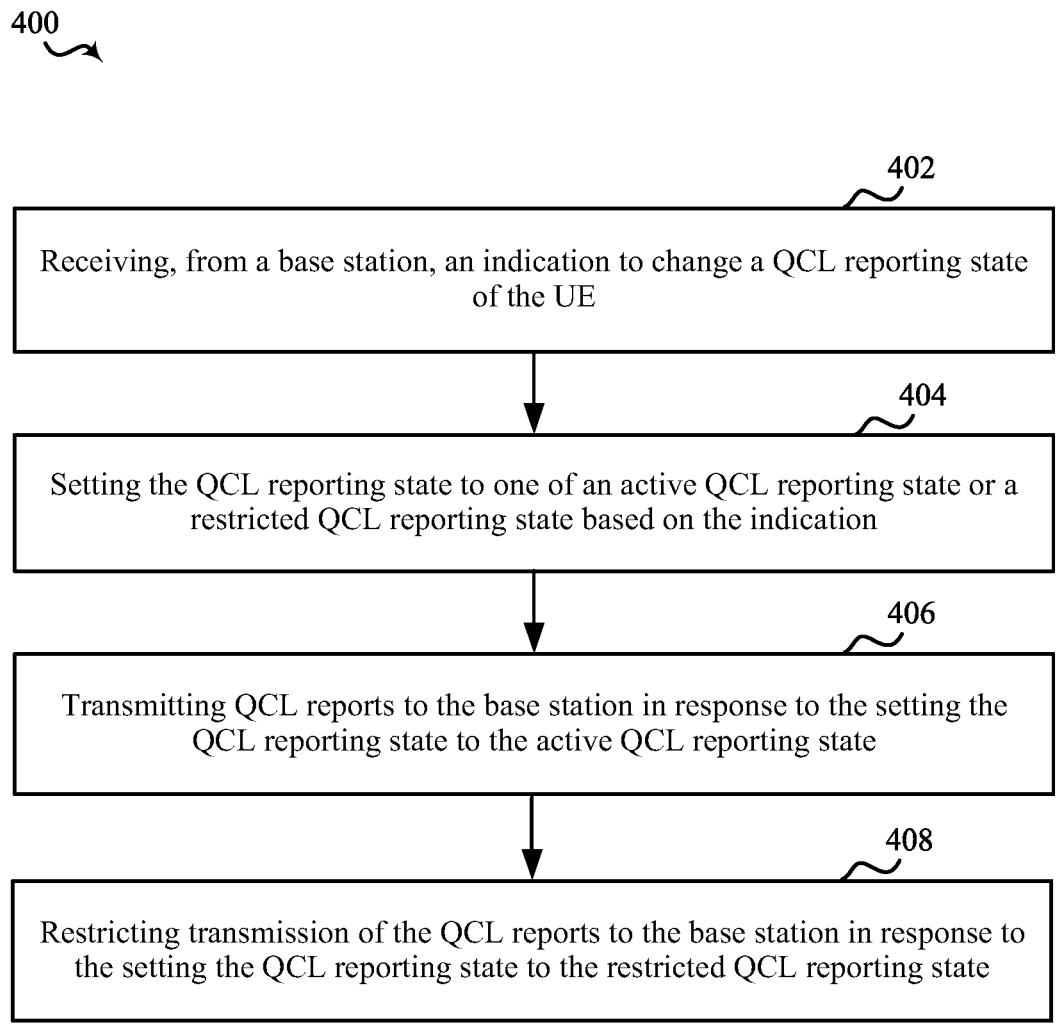
FIG. 4 is a flowchart of an example method of wireless communications by the user equipment (UE) of FIG. 1, according to aspects of the present disclosure.

Referring to FIG. 4, an example method of wireless communications is disclosed. The method 400 may be performed by the UE 104 along with any of the components (see e.g., FIG. 5) of the UE 104. For example, the method 400, may be performed by one or more of a processor 512, a transceiver 502, the modem 144, the QCL reporting component 146, and/or one or more additional components/subcomponents of the UE 104.

Turning to FIG. 4, at 402, the method 400 may include receiving, from a base station, an indication to change a QCL reporting state of the UE. For example, one or more of the processor 512, the transceiver 502, the modem 144, the QCL reporting component 146, and/or one or more components/subcomponents of the UE 104 may be configured to receive, from the base station 102, an indication to change a QCL reporting state of the UE 104. Thus, the processor 512, the transceiver 502, the modem 144, the QCL reporting component 146, and/or one or more components/subcomponents of the UE 104 may define the means for receiving, from the base station 102, an indication to change a QCL reporting state of the UE 104. In an example, the indication may be received in response to a request to restrict QCL reporting transmitted to the base station 102 from the UE 104.

At 404, the method 400 may also include setting the QCL reporting state to one of an active QCL reporting state or a restricted QCL reporting state based on the indication. For example, one or more of the processor 512, the modem 144, the QCL reporting component 146, and/or one or more components/subcomponents of the UE 104 may be configured to set the QCL reporting state to one of an active QCL reporting state or a restricted QCL reporting state based on the indication. Thus, the processor 512, the modem 144, the QCL reporting component 146, and/or one or more components/subcomponents of the UE 104 may define the means for setting the QCL reporting state to one of an active QCL reporting state or a restricted QCL reporting state based on the indication.

At 406, the method 400 may include transmitting QCL reports to the base station in response to the setting the QCL reporting state to the active QCL reporting state. For example, one or more of the processor 512, the transceiver 502, the modem 144, the QCL reporting component 146, and/or one or more components/subcomponents of the UE 104 may be configured to transmit QCL reports to the base station 102 in response to the setting the QCL reporting state to the active QCL reporting state. Thus, the processor 512, the transceiver 502, the modem 144, the QCL reporting component 146, and/or one or more components/subcomponents of the UE 104 may define the means for transmitting QCL reports to the base station 102 in response to the setting the QCL reporting state to the active QCL reporting state. In an example, the QCL reports may be transmitted to the base station 102 until a subsequent indication is received by the UE 104.

At 408, the method 400 may include restricting transmission of the QCL reports to the base station in response to the setting the QCL reporting state to the restricted QCL reporting state. For example, one or more of the processor 512, the transceiver 502, the modem 144, the QCL reporting component 146, and/or one or more components/subcomponents of the UE 104 may be configured to restrict transmission of the QCL reports to the base station 102 in response to the setting the QCL reporting state to the restricted QCL reporting state. Thus, the processor 512, the transceiver 502, the modem 144, the QCL reporting component 146, and/or one or more components/subcomponents of the UE 104 may define the means for restricting transmission of the QCL reports to the base station 102 in response to the setting the QCL reporting state to the restricted QCL reporting state.

Figure 5:
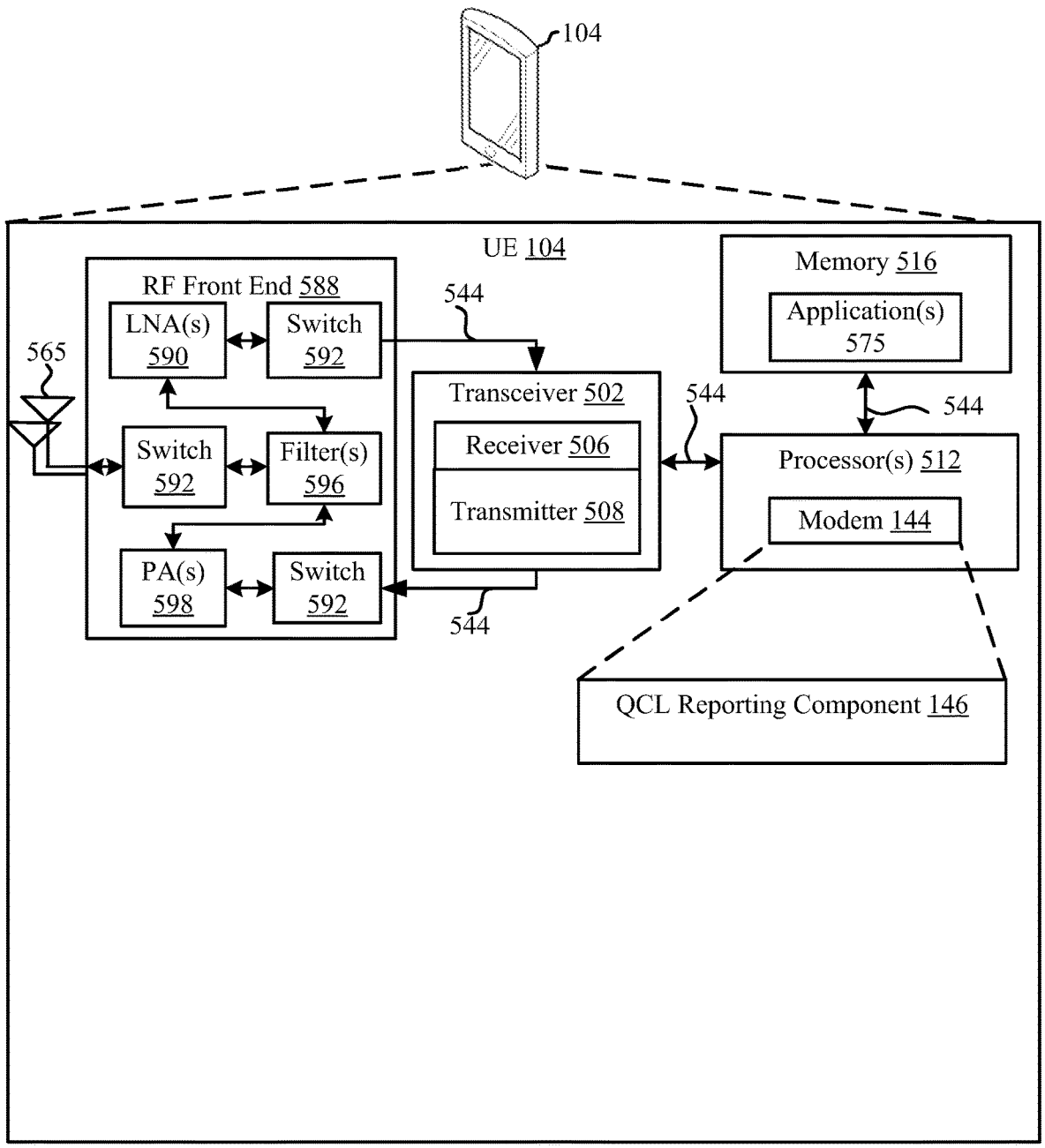
FIG. 5 is a schematic diagram of an example of the UE of FIG. 1, according to aspects of the present disclosure.

Referring to FIG. 5, one example of an implementation of the UE 104 may include a variety of components, some of which have already been described above, but including components such as one or more processors 512, memory 516 and transceiver 502 in communication via one or more buses 544, which may operate in conjunction with the modem 144 and the QCL reporting component 146 to enable one or more of the functions of the method 400 described herein.

The transceiver 502, receiver 506, transmitter 508, one or more processors 512, memory 516, applications 575, buses 544, RF front end 588, LNAs 590, switches 592, filters 596, PAs 598, and one or more antennas 565 may be the same as or similar to the corresponding components of the base station 102, as described above, but configured or otherwise programmed for UE operations as opposed to base station operations.

SOME FURTHER EXAMPLES

An example method of wireless communication by a base station, comprising: determining to change a QCL reporting state for a UE, wherein the QCL reporting state is one of an active QCL reporting state or a restricted QCL reporting state; generating an indication to indicate a change in the QCL reporting state to the UE in response to the determining to change the QCL reporting state; and transmitting, to the UE, the indication in response to the generating the indication.

The above example method, wherein the generating the indication comprises: setting a current value of a QCL-type toggle bit to be different from a previous value of the QCL-type toggle bit.

One or more of the above example methods, further comprising: receiving a request from the UE to restrict QCL reporting, wherein the determining to change the QCL reporting state is in response to the receiving the request.

One or more of the above example methods, further comprising: determining a beam change occurred, wherein the determining to change the QCL reporting state is in response to the determining the beam change.

One or more of the above example methods, further comprising: determining a QCL type for a current beam is a same QCL type as a previous beam, wherein the determining to change the QCL reporting state is further in response to the determining the QCL type for the current beam is the same QCL type as the previous beam.

One or more of the above example methods, further comprising: determining QCL reporting will result in a power saving issue for the UE, wherein the determining to change the QCL reporting state for the UE is in response to the determining the QCL reporting will result in the power saving issue for the UE.

One or more of the above example methods, wherein the determining to change the QCL reporting state is on a symbol-to-symbol basis, a slot-to-slot basis, or a multiple slot-to-multiple slot basis.

One or more of the above example methods, wherein the indication further indicates changes to a first QCL type, a second QCL type, or both QCL types.

One or more of the above example methods, further comprising: storing QCL relationship settings received from a previous QCL report; and communicating with the UE based on the QCL relationship settings in response to the QCL reporting state being the restricted QCL reporting state.

An example base station, comprising: a memory storing instructions; and one or more processors coupled with the memory and configured to: determine to change a quasi co-location (QCL) reporting state for a user equipment (UE), wherein the QCL reporting state is one of an active QCL reporting state or a restricted QCL reporting state; generate an indication to indicate a change in the QCL reporting state to the UE in response to determining to change the QCL reporting state; and transmit, to the UE, the indication in response to generating the indication.

The above example base station, wherein the one or more processors is further configured to: set a current value of a QCL-type toggle bit to be different from a previous value of the QCL-type toggle bit.

One or more of the above example base stations, wherein the one or more processors is further configured to: receive a request from the UE to restrict QCL reporting, wherein the one or more processors determines to change the QCL reporting state in response to receiving the request.

One or more of the above example base stations, wherein the one or more processors is further configured to: determine a beam change occurred, wherein the one or more processors determines to change the QCL reporting state in response to determining the beam change.

One or more of the above example base stations, wherein the one or more processors is further configured to: determine a QCL type for a current beam is a same QCL type as a previous beam, wherein the one or more processors determines to change the QCL reporting state in response to determining the QCL type for the current beam is the same QCL type as the previous beam.

One or more of the above example base stations, wherein the one or more processors is further configured to: determine QCL reporting will result in a power saving issue for the UE, wherein the one or more processors determines to change the QCL reporting state in response to determining the QCL reporting will result in the power saving issue for the UE.

One or more of the above example base stations, wherein the one or more processors determines to change the QCL reporting state on a symbol-to-symbol basis, a slot-to-slot basis, or a multiple slot-to-multiple slot basis.

One or more of the above example base stations, wherein the indication further indicates changes to a first QCL type, a second QCL type, or both QCL types.

One or more of the above example base stations, wherein the one or more processors is further configured to: storing QCL relationship settings received from a previous QCL report; and communicating with the UE based on the QCL relationship settings in response to the QCL reporting state being the restricted QCL reporting state.

An example apparatus for use in a device (e.g., base station) comprising means for wireless communication, means for storing instructions and data, and means for performing all or part of one or more of the above example methods.

An example computer-readable medium storing computer executable code for use in a device (e.g., base station), the computer-readable medium comprising code to perform all or part of one or more of the above example methods.

A second example method of wireless communication by a UE, comprising: receiving, from a base station, an indication to change a QCL reporting state of the UE; setting the QCL reporting state to one of an active QCL reporting state or a restricted QCL reporting state based on the indication; transmitting QCL reports to the base station in response to the setting the QCL reporting state to the active QCL reporting state; and restricting transmission of the QCL reports to the base station in response to the setting the QCL reporting state to the restricted QCL reporting state.

The above second example method further comprising: storing a previous value of a QCL-type toggle bit, wherein the receiving the indication to change the QCL reporting state comprises: comparing a current value of the QCL-type toggle bit received from the base station to the previous value of the QCL-type toggle bit, wherein the indication to change the QCL reporting state is based on the current value of the QCL-type toggle bit being different from the previous value of the QCL-type toggle bit.

One or more of the above example second methods, further comprising: storing a previous QCL reporting state of the UE, wherein the setting the QCL reporting state to one of the active QCL reporting state or the restricted QCL reporting state comprises: changing the QCL reporting state to one of the active QCL reporting state or the restricted QCL reporting state different from the previous QCL reporting state in response to the current value of the QCL-type toggle bit being different from the previous value of the QCL-type toggle bit.

One or more of the above example second methods, further comprising: transmitting, to the base station, a request from the UE to restrict QCL reporting, wherein the receiving the indication is in response to the transmitting the request. One or more of the above example second methods, wherein the QCL reports are transmitted or the transmission of the QCL reports are restricted until a subsequent indication is received An example user equipment (UE), comprising: a memory storing instructions; and one or more processors coupled with the memory and configured to: receive, from a base station, an indication to change a quasi co-location (QCL) reporting state of the UE; set the QCL reporting state to one of an active QCL reporting state or a restricted QCL reporting state based on the indication; transmit QCL reports to the base station in response to setting the QCL reporting state to the active QCL reporting state; and restrict transmission of the QCL reports to the base station in response to setting the QCL reporting state to the restricted QCL reporting state.

The above example UE, wherein the one or more processors is further configured to: store a previous value of a QCL-type toggle bit; and compare a current value of the QCL-type toggle bit received from the base station to the previous value of the QCL-type toggle bit, wherein the indication to change the QCL reporting state is based on the current value of the QCL-type toggle bit being different from the previous value of the QCL-type toggle bit.

One or more of the above example UEs, wherein the one or more processors is further configured to: store a previous QCL reporting state of the UE; and change the QCL reporting state to one of the active QCL reporting state or the restricted QCL reporting state different from the previous QCL reporting state in response to the current value of the QCL-type toggle bit being different from the previous value of the QCL-type toggle bit.

One or more of the above example UEs, wherein the one or more processors is further configured to: transmit, to the base station, a request from the UE to restrict QCL reporting, wherein the one or more processors is configured to receive the indication in response to transmitting the request.

One or more of the above example UEs, wherein the QCL reports are transmitted or the transmission of the QCL reports are restricted until a subsequent indication is received.

An example apparatus for use in a device (e.g., base station) comprising means for wireless communication, means for storing instructions and data, and means for performing all or part of one or more of the above example second methods.

An example computer-readable medium storing computer executable code for use in a device (e.g., base station), the computer-readable medium comprising code to perform all or part of one or more of the above example second methods.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communication by a base station, comprising:
    determining to change a quasi co-location (QCL) reporting state for a user equipment (UE), wherein the QCL reporting state is one of an active QCL reporting state during which the UE is active in transmitting one or more QCL reports to the base station or a restricted QCL reporting state during which the UE is restricted from transmitting one or more QCL reports to the base station;
    generating, in response to the determining to change the QCL reporting state, an indication to indicate a change in the QCL reporting state to the UE from the active QCL reporting state to the restricted QCL reporting state, or from the restricted QCL reporting state to the active QCL reporting state; and
    transmitting, to the UE, the indication in response to the generating the indication.

2. The method of claim 1, wherein the generating the indication comprises:
    setting a current value of a QCL-type toggle bit to be different from a previous value of the QCL-type toggle bit.

3. The method of claim 1, further comprising:
    receiving a request from the UE to restrict QCL reporting, wherein the determining to change the QCL reporting state is in response to the receiving the request.

4. The method of claim 1, further comprising:
    determining a beam change occurred, wherein the determining to change the QCL reporting state is in response to the determining the beam change.

5. The method of claim 1, further comprising:
    determining a QCL type for a current beam is a same QCL type as a previous beam, wherein the determining to change the QCL reporting state is further in response to the determining the QCL type for the current beam is the same QCL type as the previous beam.

6. The method of claim 1, further comprising:
    determining QCL reporting will result in a power saving issue for the UE, wherein the determining to change the QCL reporting state for the UE is in response to the determining the QCL reporting will result in the power saving issue for the UE.

7. The method of claim 1, wherein the determining to change the QCL reporting state is on a symbol-to-symbol basis, a slot-to-slot basis, or a multiple slot-to-multiple slot basis.

8. The method of claim 1, wherein the indication further indicates changes to a first QCL type, a second QCL type, or both QCL types.

9. The method of claim 1, further comprising:
    storing QCL relationship settings received from a previous QCL report; and
    communicating with the UE based on the QCL relationship settings in response to the QCL reporting state being the restricted QCL reporting state.

10. A method of wireless communication by a user equipment (UE), comprising:
    receiving, from a base station, an indication to change a quasi co-location (QCL) reporting state of the UE, wherein the QCL reporting state is one of an active QCL reporting state during which the UE is active in transmitting one or more QCL reports to the base station or a restricted QCL reporting state during which the UE is restricted from transmitting one or more QCL reports to the base station; and
    changing, based on the indication, the QCL reporting state from the active QCL reporting state to the restricted QCL state, or from the restricted QCL reporting state to the active QCL state.

11. The method of claim 10, further comprising:
storing a previous value of a QCL-type toggle bit, wherein the receiving the indication to change the QCL reporting state comprises:
comparing a current value of the QCL-type toggle bit received from the base station to the previous value of the QCL-type toggle bit, wherein the indication to change the QCL reporting state is based on the current value of the QCL-type toggle bit being different from the previous value of the QCL-type toggle bit.

12. The method of claim 10, further comprising:
storing a previous QCL reporting state of the UE, wherein the setting the QCL reporting state to one of the active QCL reporting state or the restricted QCL reporting state comprises:
changing the QCL reporting state to one of the active QCL reporting state or the restricted QCL reporting state different from the previous QCL reporting state in response to the current value of the QCL-type toggle bit being different from the previous value of the QCL-type toggle bit.

13. The method of claim 10, further comprising:
transmitting, to the base station, a request from the UE to restrict QCL reporting, wherein the receiving the indication is in response to the transmitting the request.

14. The method of claim 10, further comprising transmitting one or more QCL reports to the base station in response to the indication setting the QCL reporting state to the active QCL reporting state, or restricting transmission of one or more QCL reports to the base station in response to the indication setting the QCL reporting state to the restricted QCL reporting state, and wherein QCL reports are transmitted or the transmission of QCL reports are restricted until a subsequent indication is received.

15. A base station, comprising:
a memory storing instructions; and
one or more processors coupled with the memory and configured to:
determine to change a quasi co-location (QCL) reporting state for a user equipment (UE), wherein the QCL reporting state is one of an active QCL reporting state during which the UE is active in transmitting one or more QCL reports to the base station or a restricted QCL reporting state during which the UE is restricted from transmitting one or more QCL reports to the base station;
generate, in response to the determination to change the QCL reporting state, an indication to indicate a change in the QCL reporting state to the UE from the active QCL reporting state to the restricted QCL reporting state, or from the restricted QCL reporting state to the active QCL reporting state; and
transmit, to the UE, the indication in response to generating the indication.

16. The base station of claim 15, wherein the one or more processors are further configured to:
set a current value of a QCL-type toggle bit to be different from a previous value of the QCL-type toggle bit.

17. The base station of claim 15, wherein the one or more processors are further configured to:
receive a request from the UE to restrict QCL reporting, wherein the one or more processors are configured to determine to change the QCL reporting state in response to receipt of the request.

18. The base station of claim 15, wherein the one or more processors are further configured to:
determine a beam change occurred, wherein the one or more processors are configured to determine to change the QCL reporting state in response to the determination that the beam change occurred.

19. The base station of claim 15, wherein the one or more processors are further configured to:
determine a QCL type for a current beam is a same QCL type as a previous beam, wherein the one or more processors are configured to determine to change the QCL reporting state in response to the determination that the QCL type for the current beam is the same QCL type as the previous beam.

20. The base station of claim 15, wherein the one or more processors are further configured to:
determine QCL reporting will result in a power saving issue for the UE, wherein the one or more processors are configured to determine to change the QCL reporting state in response to the determination that the QCL reporting will result in the power saving issue for the UE.

21. The base station of claim 15, wherein the one or more processors are configured to determine to change the QCL reporting state on a symbol-to-symbol basis, a slot-to-slot basis, or a multiple slot-to-multiple slot basis.

22. The base station of claim 15, wherein the indication further indicates changes to a first QCL type, a second QCL type, or both QCL types.

23. The base station of claim 15, wherein the one or more processors are further configured to:
store QCL relationship settings received from a previous QCL report; and
communicate with the UE based on the QCL relationship settings in response to the QCL reporting state being the restricted QCL reporting state.

24. A user equipment (UE), comprising:
a memory storing instructions; and
one or more processors coupled with the memory and configured to:
receive, from a base station, an indication to change a quasi co-location (QCL) reporting state of the UE, wherein the QCL reporting state is one of an active QCL reporting state during which the UE is active in transmitting one or more QCL reports to the base station or a restricted QCL reporting state during which the UE is restricted from transmitting one or more QCL reports to the base station; and
change, based on the indication, set the QCL reporting state from the active QCL reporting state to the restricted QCL state, or from the restricted QCL reporting state to the active QCL state.

25. The UE of claim 24, wherein the one or more processors are further configured to:
store a previous value of a QCL-type toggle bit; and
compare a current value of the QCL-type toggle bit received from the base station to the previous value of the QCL-type toggle bit, wherein the indication to change the QCL reporting state is based on the current value of the QCL-type toggle bit being different from the previous value of the QCL-type toggle bit.

26. The UE of claim 24, wherein the one or more processors are further configured to:
store a previous QCL reporting state of the UE; and
change the QCL reporting state to one of the active QCL reporting state or the restricted QCL reporting state different from the previous QCL reporting state in response to the current value of the QCL-type toggle bit being different from the previous value of the QCL-type toggle bit.

27. The UE of claim 24, wherein the one or more processors are further configured to:
transmit, to the base station, a request from the UE to restrict QCL reporting, wherein the one or more processors are configured to receive the indication in response to transmission of the request.

28. The UE of claim 24, wherein the one or more processors are further configured to transmit one or more QCL reports to the base station in response to the indication setting the QCL reporting state to the active QCL reporting state, or restrict transmission of one or more QCL reports to the base station in response to the indication setting the QCL reporting state to the restricted QCL reporting state, and wherein QCL reports are transmitted or the transmission of QCL reports are restricted until a subsequent indication is received.

* * * * *